US012812488B2

(12) United States Patent
Lee et al.

(10) Patent No.: US 12,812,488 B2
(45) Date of Patent: Nov. 24, 2026

(54) ELECTRONIC DEVICE FOR SEARCHING TERRESTRIAL NETWORK AND METHOD FOR THE SAME

(71) Applicant: SAMSUNG ELECTRONICS CO., LTD., Suwon-si (KR)

(72) Inventors: Keonyoung Lee, Suwon-si (KR); Poongup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 18/432,551

(22) Filed: Feb. 5, 2024

(65) Prior Publication Data

US 2024/0284286 A1 Aug. 22, 2024

Related U.S. Application Data

(63) Continuation of application No. PCT/KR2024/000625, filed on Jan. 12, 2024.

(30) Foreign Application Priority Data

Feb. 17, 2023 (KR) ........................ 10-2023-0021316
Mar. 21, 2023 (KR) ........................ 10-2023-0036600

(51) Int. Cl.
*H04W 36/14* (2009.01)
*H04W 36/00* (2009.01)
(Continued)

(52) U.S. Cl.
CPC ....... *H04W 36/14* (2013.01); *H04W 36/0085* (2018.08); *H04W 36/185* (2023.05); *H04W 84/06* (2013.01); *H04W 88/06* (2013.01)

(58) Field of Classification Search
CPC ............. H04W 36/14; H04W 36/0085; H04W 36/185; H04W 84/06; H04W 88/06
See application file for complete search history.

(56) References Cited

U.S. PATENT DOCUMENTS 7,107,062 B2 9/2006 Cruz
7,418,263 B2 8/2008 Dutta
(Continued)

FOREIGN PATENT DOCUMENTS

CN 115460661 A 12/2022
JP 2020137065 A 8/2020
(Continued)

OTHER PUBLICATIONS

Search Report and Written Opinion dated Apr. 9, 2024 issued in International Patent Application No. PCT/KR2024/000625.
(Continued)

*Primary Examiner* — Fred A Casca
(74) *Attorney, Agent, or Firm* — Nixon & Vanderhye P.C.

(57) ABSTRACT

An electronic device includes a communication circuit configured to support cellular communication through a terrestrial network and a non-terrestrial network and at least one communication processor, comprising processing circuitry, wherein at least one communication processor, individually and/or collectively, is configured to: determine, based on a frequency of a terrestrial network having a previous connection history before a connection to the non-terrestrial network and/or frequency information of a pre-stored terrestrial network, a frequency of the terrestrial network to be found, perform a search for the terrestrial network in a section in which data is not received, based on a location of the electronic device, and determine whether to release a connection with the non-terrestrial network and make the connection to the terrestrial network according to whether a specified condition is satisfied based on the terrestrial network being found.

18 Claims, 12 Drawing Sheets

(51) Int. Cl.

| | |
|---|---|
| ***H04W 36/18*** | (2009.01) |
| *H04W 84/06* | (2009.01) |
| *H04W 88/06* | (2009.01) |

(56) References Cited

U.S. PATENT DOCUMENTS

| | | | | |
|---|---|---|---|---|
| 11,539,427 | B2 | 12/2022 | Faccin | |
| 2008/0287067 | A1* | 11/2008 | Kawamura | B60R 25/24 455/63.1 |
| 2012/0309391 | A1* | 12/2012 | Zhang | H04W 48/16 455/435.2 |
| 2018/0213454 | A1* | 7/2018 | Santhanam | H04W 36/0085 |
| 2021/0068013 | A1 | 3/2021 | Cheng | |
| 2021/0235364 | A1 | 7/2021 | Kim et al. | |
| 2021/0235416 | A1 | 7/2021 | Dou et al. | |
| 2022/0353760 | A1 | 11/2022 | Jeong et al. | |
| 2023/0164647 | A1* | 5/2023 | Tao | H04W 36/083 370/331 |
| 2023/0180287 | A1 | 6/2023 | Choi | |
| 2023/0292210 | A1 | 9/2023 | Choi | |
| 2024/0121692 | A1* | 4/2024 | Jia | H04W 36/322 |
| 2024/0215110 | A1 | 6/2024 | Kim | |

FOREIGN PATENT DOCUMENTS

| | | | |
|---|---|---|---|
| KR | 10-2020-0067091 | | 6/2020 |
| KR | 10-2021-0061407 | | 5/2021 |
| KR | 10-2021-0150281 | | 12/2021 |
| KR | 10-2022-0009882 | | 1/2022 |
| KR | 10-2394625 | | 5/2022 |
| KR | 20220075217 | A | 6/2022 |
| KR | 10-2429846 | | 8/2022 |
| KR | 10-2458047 | | 10/2022 |
| KR | 20220137420 | A | 10/2022 |
| WO | 2021/180154 | | 9/2021 |
| WO | 2022/038573 | | 2/2022 |

OTHER PUBLICATIONS

3GPP TR 38.811 V15.1.0, 3rd Generation Partnership Project; Technical Specification Group Radio Access Network, Release 15, 126 pages, Jun. 2019, Study on New Radio (NR) to support non-terrestrial networks.

3GPP TS 36.213 V16.2.0, Number of HARQ processes in multi-TB scheduling in CE mode B in TDD in LTE-MTC, R1-2007307, 29 pages, Jun. 2020.

3GPP TS 38.300 V17.0.0, 3rd Generation Partnership Project; Technical Specification Group Radio Access Network;, Release 17, 204 pages, Mar. 2022, NR; NR and NG-RAN Overall Description; Stage 2.

ETSI TS 122 261 V17.11.0, 5G, Service requirements for the 5G system, Release 17, 87 pages, Oct. 2022, 3GPP TS 22.261 version 17.11.0.

* cited by examiner

ELECTRONIC DEVICE FOR SEARCHING TERRESTRIAL NETWORK AND METHOD FOR THE SAME

CROSS-REFERENCE TO RELATED APPLICATIONS

This application is a continuation of International Application No. PCT/KR2024/000625 designating the United States, filed on Jan. 12, 2024, in the Korean Intellectual Property Receiving Office and claiming priority to Korean Patent Application Nos. 10-2023-0021316, filed on Feb. 17, 2023, and 10-2023-0036600, filed on Mar. 21, 2023, in the Korean Intellectual Property Office, the disclosures of each of which are incorporated by reference herein in their entireties.

BACKGROUND

Field

The disclosure relates to an electronic device, for example, an electronic device searching for a terrestrial network.

Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. In addition to the bands (6 GHz or lower bands) used in LTE, the 5G communication system is also considered to be implemented in ultrahigh frequency (mm Wave) bands (e.g., 6 GHz or higher bands) so as to accomplish higher data rates. In 5G communication systems, beamforming, massive multiple-input multiple-output (massive MIMO), full dimensional MIMO (FD-MIMO), array antenna, analog beam forming, large scale antenna techniques are under discussion.

A recent $5^{th}$-generation communication system considers provision of a communication service using not only a base station fixed to the ground but also an entity which is not fixed to the ground. According to an embodiment, the $5^{th}$-generation communication system considers implementation of cellular communication using a satellite. An electronic device may perform cellular communication using a satellite in a situation in which it is difficult to make a connection with a base station. The cellular communication using the satellite may realize wider coverage than cellular communication using the base station due to a characteristic of the satellite orbiting earth. The cellular communication using the satellite is highlighted for reducing a shaded area in which a communication service is impossible.

However, the cellular communication using the satellite may have a lower transmission speed and/or reception speed than the cellular communication using the base station, and thus may be used for performing a limited service (for example, a short message service (SMS)) or a voice call. An electronic device performing cellular communication may attempt data transmission and/or reception through the cellular communication using the base station and, when the electronic device is not connected to the base station or the cellular communication using the satellite is advantageous, may perform the cellular communication using the satellite.

An electronic device may attempt a search for a terrestrial network performing data communication through a base station and, as the search for the terrestrial network fails and/or the connection of the terrestrial network is released, may attempt a search for a non-terrestrial network performing data communication through a satellite. The electronic device may attempt access to the found non-terrestrial network and transmit and/or receive data through a satellite as the connection is completed.

SUMMARY

An electronic device according to an example embodiment may include: a communication circuit configured to support cellular communication through a terrestrial network and a non-terrestrial network and at least one communication processor, comprising processing circuitry, wherein at least one communication processor, individually and/or collectively, is configured to: determine, based on a frequency of a terrestrial network having a previous connection history before a connection to the non-terrestrial network and/or frequency information of a pre-stored terrestrial network, a frequency of the terrestrial network to be found, perform a search for the terrestrial network in a section in which data is not received, based on a location of the electronic device, and determine whether to release a connection with the non-terrestrial network and make the connection to the found terrestrial network according to whether a specified condition is satisfied based on the terrestrial network being found.

A method of operating an electronic device includes: determining, based on a frequency of a terrestrial network having a previous connection history before a connection to the non-terrestrial network and/or frequency information of a pre-stored terrestrial network, a frequency of the terrestrial network to be found, performing a search for the terrestrial network in a section in which data is not received, based on a location of the electronic device, and determining whether to release a connection with the non-terrestrial network and make the connection to the found terrestrial network according to whether a specified condition is satisfied, based on the terrestrial network being found.

According to various example embodiments, an electronic device can search for a terrestrial network even during a connection with a non-terrestrial network. Further, the terrestrial network can be found even in a state in which the connection with the non-terrestrial network is being prepared.

According to various example embodiments, the electronic device may search for the terrestrial network in a section (for example, a guard period (GP) in a time division duplex (TDD) system) in which no data is transmitted, so that the search for the terrestrial network can be performed without separate time delay or frequency allocation.

According to various example embodiments, the electronic device can improve a data transmission rate by maintaining the connection with the non-terrestrial network or making the connection to the terrestrial network according to a predetermined (e.g., specified) condition.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
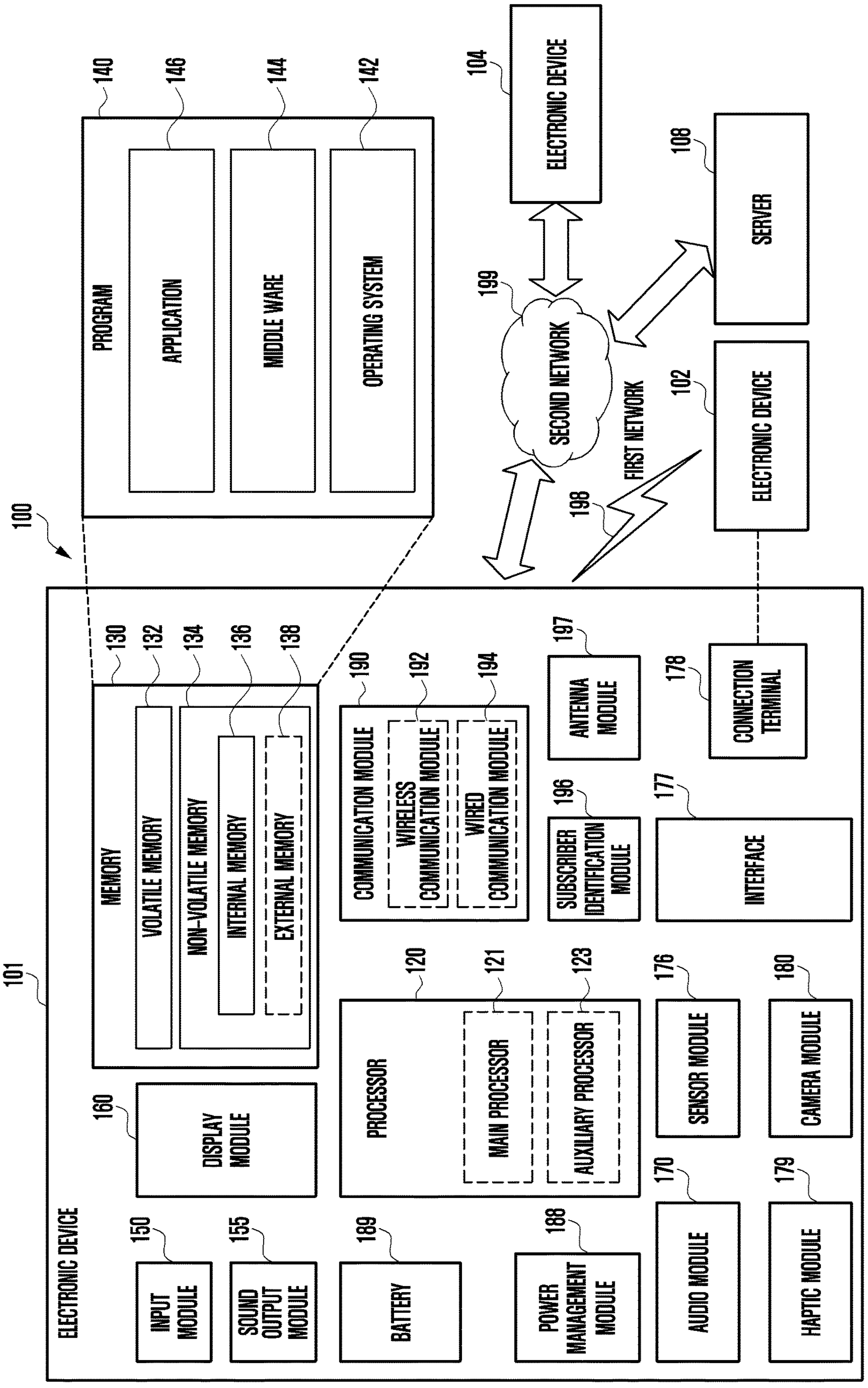
FIG. 1 is a block diagram illustrating an example electronic device within a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1 module 150, a sound output 1 module 155, a display 1 module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the 11 connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160). 11

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1 module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1 module 150 may receive a command or data to be used by another component (e.g., the processor 120) of the electronic device 101, from the outside (e.g., a user) of the electronic device 101. The input 1 module 150 may include, for example, a microphone, a mouse, a keyboard, a key (e.g., a button), or a digital pen (e.g., a stylus pen).

The sound output module 155 may output sound signals to the outside of the electronic device 101. The sound output 1 module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1 module 160 may visually provide information to the outside (e.g., a user) of the electronic device 101. The display 1 module 160 may include, for example, a display, a hologram device, or a projector and control circuitry to control a corresponding one of the display, hologram device, and projector. According to an embodiment, the display 1 module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1 module 150, or output the sound via the sound output 1 module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (cMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit and/or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting and/or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
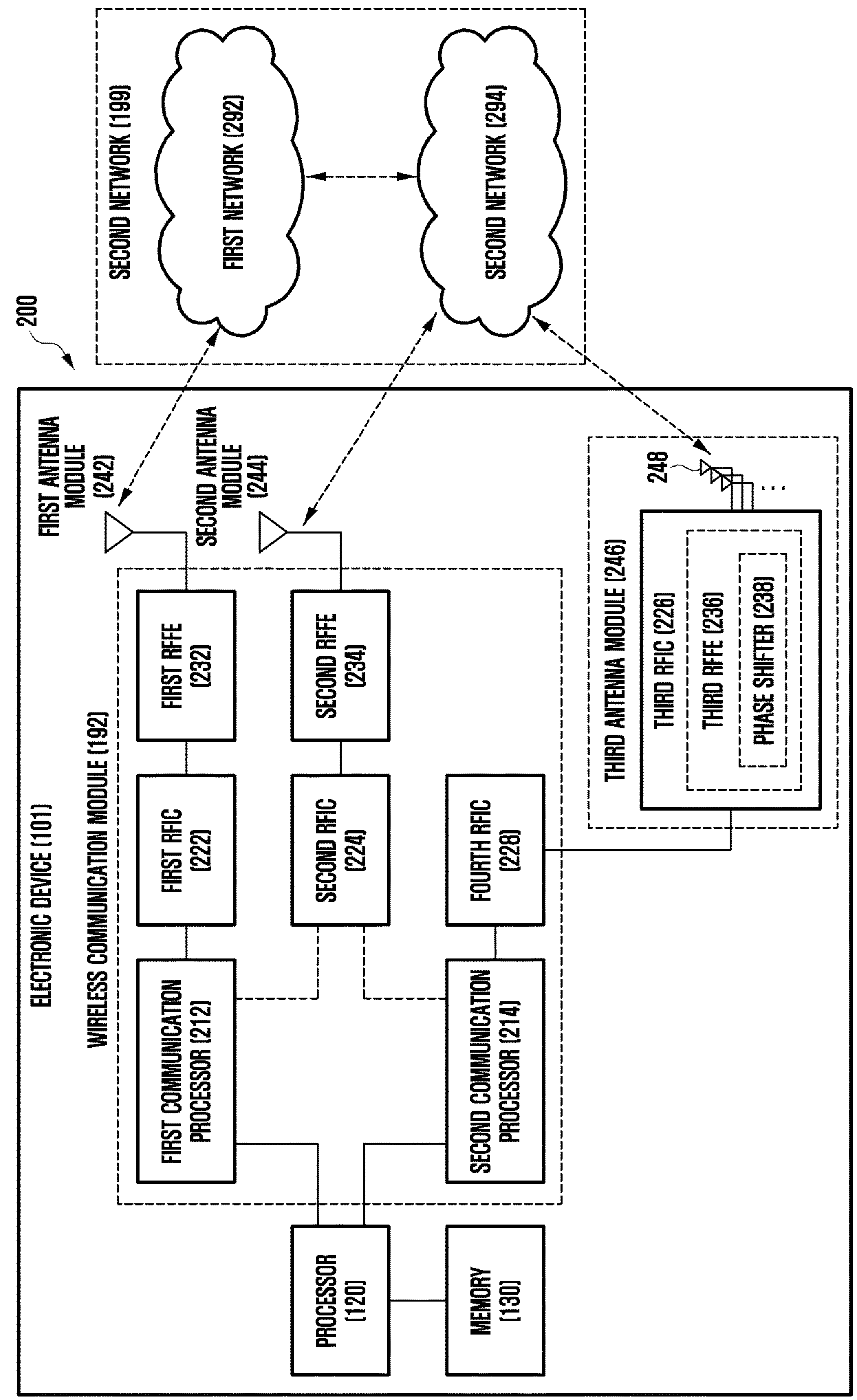
FIG. 2 is a block diagram illustrating an example configuration of an electronic device for supporting legacy network communication and 5G network communication according to various embodiments.

FIG. 2 is a block diagram 200 illustrating an example configuration of an electronic device 101 for supporting legacy network communication and 5G network communication according to various embodiments. Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor (e.g., including processing circuitry) 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to an embodiment, the fourth RFIC 228 may be omitted or may be included as a part of the third RFIC 226.

The first communication processor 212 may include various processing circuitry and/or multiple processors. For example, as used herein, including the claims, the term "processor", "communication processor", or the like, may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The first communication processor 212, may, for example, establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may include various processing circuitry and/or multiple processors. For example, as used herein, including the claims, the term "processor", "communication processor", or the like, may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second communication processor 214 may, for example, establish a communication channel corresponding to a designated band (e.g., approximately 6 GHz to 60 GHZ) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHZ) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHZ) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHZ), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
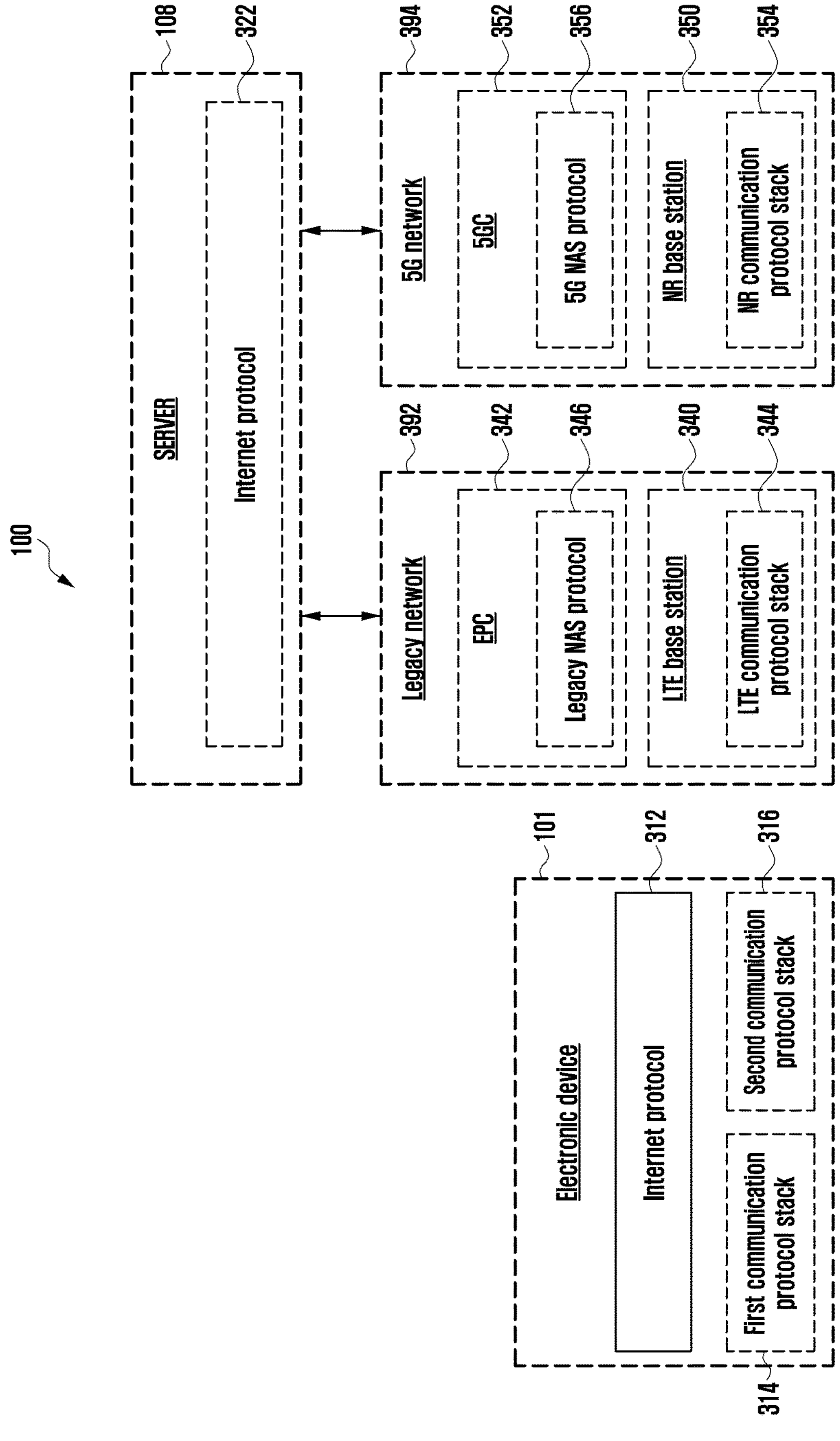
FIG. 3 is a diagram illustrating a protocol stack structure of a network 100 of legacy communication and/or 5G communication according to various embodiments.

FIG. 3 is a diagram illustrating a protocol stack structure of the network 100 of legacy communication and/or 5G communication according to various embodiments.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Internet communication associated with the server 108 through the Internet protocol 312 (for example, a TCP, a UDP, or an IP). The Internet protocol 312 may be executed by, for example, a main processor (e.g., including processing circuitry, for example, the main processor 121 of FIG. 1) included in the electronic device 101.

According to an embodiment, the electronic device 101 may perform wireless communication with the legacy network 392 through the first communication protocol stack 314. According to an embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4:
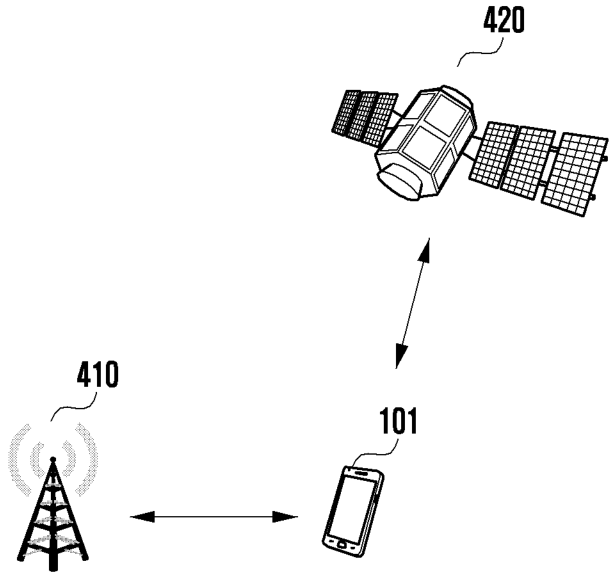
FIG. 4 is a diagram illustrating an electronic device and a long-distance communication network environment according to various embodiments.

FIG. 4 is a diagram illustrating an electronic device and a long-distance communication network environment according to various embodiments.

An electronic device (for example, the electronic device 101 of FIG. 1) may transmit and/or receive data through a terrestrial network and/or a non-terrestrial network.

The terrestrial network may refer to a network which can provide data communication through a terrestrial wireless communication device 410. For example, the terrestrial wireless communication device 410 may include a base station located on the ground (for example, fixed to the ground). The terrestrial wireless communication device 410 may support at least one communication scheme among various communication schemes which can be supported by the electronic device 101. For example, the terrestrial wireless communication device 410 may include an eNodeB or a gNodeB, but there is no limitation in the type thereof.

The non-terrestrial network may refer to a network which can provide data communication through a non-terrestrial wireless communication device 420. For example, the non-terrestrial wireless communication device 420 may include at least one of various communication devices such as a base station or a relay which is not located on the ground. For example, the non-terrestrial wireless communication device 420 may include a satellite and/or an unmanned aerial vehicle. For example, the satellite may include a low-earth orbit (LEO) satellite, a medium-earth orbit (MEO) satellite, a geostationary earth orbit (GEO) satellite, and/or a high elliptical orbit (HEO) satellite.

The non-terrestrial wireless communication device 420 may support at least one of various wireless communication schemes. For example, the non-terrestrial wireless communication device 420 may support an NR non-terrestrial network (NTN) defined by a 3rd generation partnership project (3GPP). Alternatively, the non-terrestrial wireless communication device 420 may support a communication scheme based on various communication standards such as LTE, global system for mobile communications (GSM), and code-division multiple access (CDMA).

The terrestrial network and the non-terrestrial network may be networks independent from each other. The terrestrial network and the non-terrestrial network may be included in at least one network (for example, networks provided by the same service provider) associated with each other.

When the electronic device 101 cannot communicate with the terrestrial network or the communication is not smooth, the electronic device may perform wireless communication through the non-terrestrial network. Alternatively, the electronic device 101 may perform wireless communication through the non-terrestrial network regardless of a communication state of the terrestrial network according to a circumstance.

Figure 5:
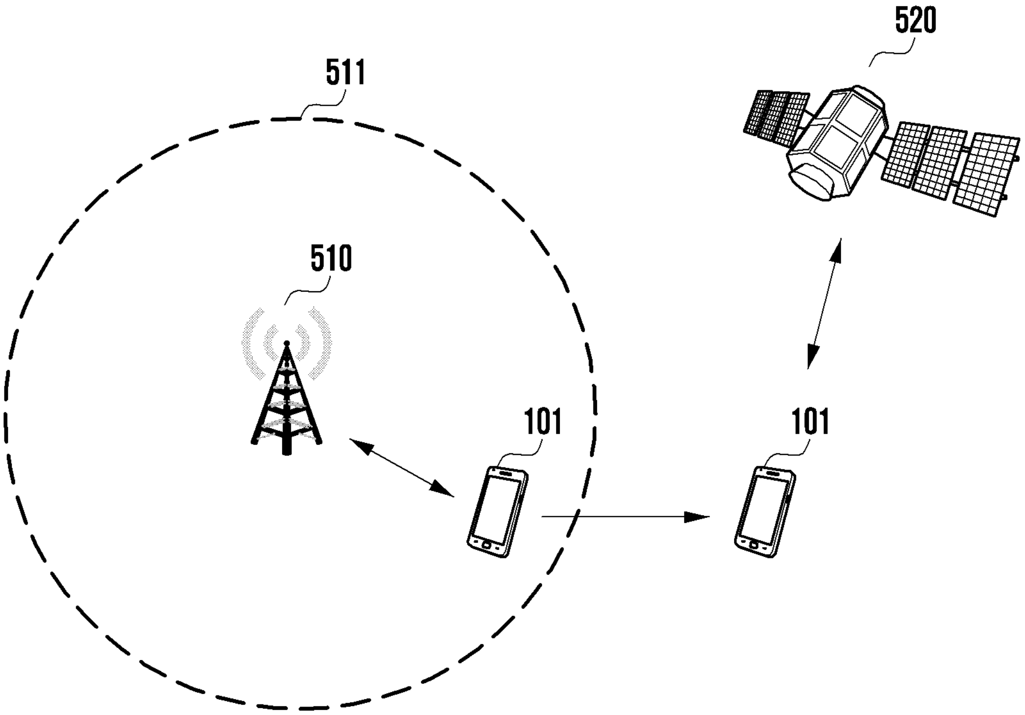
FIG. 5 is a diagram illustrating an electronic device and a cellular network according to various embodiments.

FIG. 5 is a diagram illustrating an electronic device and a cellular network according to various embodiments.

An electronic device (for example, the electronic device 101 of FIG. 1) may transmit and/or receive data through a terrestrial network and/or a non-terrestrial network.

The non-terrestrial network may refer to, for example, a network which can provide data communication through a non-terrestrial wireless communication device 520 which is not fixed to the ground. The non-terrestrial network may use another non-terrestrial wireless communication device such as a flight vehicle as well as the satellite.

The terrestrial wireless communication device 510 may include a base station supporting first cellular communication or second cellular communication. The first cellular communication is one communication scheme among various cellular communication schemes which can be supported by an electronic device (for example, the electronic device 101 of FIG. 1) and may be, for example, a communication scheme in the second cellular network 294 of FIG. 2. For example, the first cellular communication may be a communication scheme using a $5^{th}$-generation mobile communication scheme (for example, new radio (NR)). The terrestrial wireless communication device may be a base station supporting the second cellular communication. The second cellular communication is one communication scheme among various cellular communication schemes which can be supported by the electronic device 101 and may be, for example, a communication scheme in the first cellular network 292 of FIG. 2. For example, the second cellular communication may be a communication scheme using a $4^{th}$ generation mobile communication scheme (for example, long-term evolution (LTE)).

The terrestrial wireless communication device 510 may transmit and/or receive a signal in a frequency band supported by the first cellular communication or the second cellular communication. When the electronic device 101 is connected to the terrestrial network through the terrestrial wireless communication device 510, data communication may be performed using a signal in a frequency band supported by the terrestrial wireless communication device 510.

The non-terrestrial wireless communication device 520 may serve as a base station supporting the first cellular communication or the second cellular communication. According to an embodiment, the non-terrestrial wireless communication device 520 may include a base station and/or a relay supporting the non-terrestrial network according to the standard (for example, NR-NTN) for the non-terrestrial network of the 3GPP but is not limited thereto, and may include a non-terrestrial network (for example, iridium) that does not follow the standard for the non-terrestrial network.

The non-terrestrial wireless communication device 520 may transmit and/or receive a signal in a frequency band supported by the first cellular communication or the second cellular communication. When the electronic device 101 is connected to the non-terrestrial network through the non-terrestrial wireless communication device 520, data communication may be performed using a signal in a frequency band supported by the non-terrestrial wireless communication device 520.

The electronic device 101 may attempt searching for the terrestrial network in order to perform data communication. The electronic device 101 may identify whether the signal in the frequency band supported by the terrestrial network is received. According to an embodiment, the electronic device 101 may receive a signal transmitted or broadcasted by the terrestrial wireless communication device 510 and determine that search for the terrestrial network is successful as the quality of the signal satisfies a predetermined condition (for example, a condition indicating that the quality of the signal is greater than or equal to a predetermined value).

When the electronic device 101 exists within coverage 511 of the terrestrial wireless communication device 510, the electronic device 101 may succeed in the search for the terrestrial network. The electronic device 101 may attempt registration in or access to the found terrestrial network (or the terrestrial wireless communication device 510) and, as the connection of the terrestrial network is completed, transmit and/or receive data through the terrestrial wireless communication device 510.

The electronic device 101 may fail in the search for the terrestrial network by various causes. Referring to FIG. 5, the connection of the terrestrial network is released and/or the electronic device 101 may fail in the search for the terrestrial network as the electronic device 101 moves to the outside of the coverage 511 of the terrestrial wireless communication device 510 from the inside thereof. As the electronic device 101 moves to the outside of the coverage 511 of the terrestrial wireless communication device 510 from the inside thereof, the electronic device 101 may not receive a signal transmitted or broadcasted by the terrestrial wireless communication device 510 or, although the signal transmitted or broadcasted by the terrestrial wireless communication device 510 is received, may determine that the search for the terrestrial network fails as the quality of the signal does not satisfy a predetermined condition (for example, a condition indicating that the quality of the signal is higher than or equal to a predetermined value).

Figure 6:
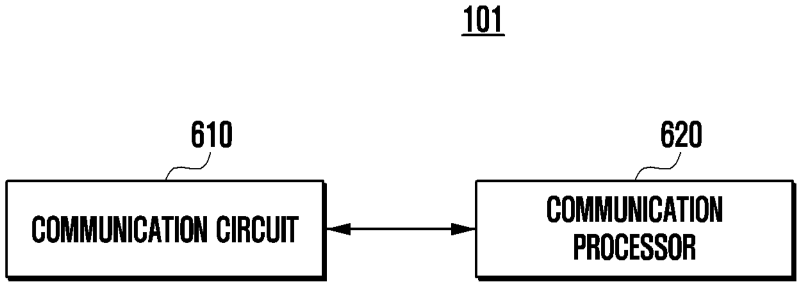
FIG. 6 is a block diagram an example configuration of an electronic device according to various embodiments.

FIG. 6 is a block diagram illustrating an example configuration of an electronic device according to various embodiments.

Referring to FIG. 6, an electronic device (for example, the electronic device 101 of FIG. 1) according to various embodiments of the disclosure may include a communication circuit 610 (for example, the wireless communication module 192) and/or a communication processor (e.g., including processing circuitry) 620 (for example, the processor 120 of FIG. 1, or the first communication processor 212 and/or the second communication processor 214 of FIG. 2).

The communication circuit 610 may include a communication circuit supporting first cellular communication and/or second cellular communication and may provide the electronic device 101 with communication with an external electronic device (for example, the electronic device 104 of FIG. 1) through the first cellular communication and/or the second cellular communication.

The communication processor 620 may include various processing circuitry and/or multiple processors. For example, as used herein, including the claims, the term "processor", "communication processor", or the like, may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The communication processor 620 may, for example, be operatively connected to the communication circuit 610. The communication processor 620 may control elements of the electronic device 101. For example, communication processor 620 may control elements of the electronic device 101 according to one or more instructions stored in memory (for example, the memory 130 of FIG. 1).

The communication processor 620 may transmit and/or receive data through a terrestrial network and/or a non-terrestrial network.

The terrestrial network may refer to a network which can provide data communication through a terrestrial wireless communication device (for example, the terrestrial wireless communication device 510 of FIG. 5) fixed to the ground.

A non-terrestrial network may refer, for example, to a network which can provide data communication through a satellite (for example, the non-terrestrial wireless communication device 520 of FIG. 5) that is not fixed to the ground.

The communication processor 620 may determine a frequency of the terrestrial network having a connection history before the connection to the non-terrestrial network in a section in which no data is received and/or a frequency of the terrestrial network to be found based on pre-stored frequency information of the terrestrial network. For example, the communication processor 620 may determine a frequency of the terrestrial network to be found based on a frequency of the terrestrial network which was last connected before the connection to the non-terrestrial network. The communication processor 620 may search for the terrestrial network, based on the location of the electronic device 101. The communication processor 620 may determine whether to release the connection to the non-terrestrial network and make the connection to the found terrestrial network, based on whether a predetermined condition is satisfied, based on the found terrestrial network. The section in which no data is received may be a guard period (GP) in a time division duplex (TDD) system and may be a section in which no communication is performed in a frequency division duplex (FDD) system. Alternatively, the section in which no data is received may be a section in which only an uplink is transmitted in time division duplex (TDD) and frequency division duplex (FDD).

The communication processor 620 may identify the location of the electronic device 101 and identify whether the location of the electronic device 101 satisfies a predetermined condition. The predetermined condition may include a condition indicating that the location of the electronic device 101 is within a predetermined distance from the location at which the signal of the terrestrial network is found before the connection to the non-terrestrial network. The communication processor 620 may identify that the location of the electronic device 101 is within the predetermined distance from the location at which the signal of the terrestrial network is found before the connection to the non-terrestrial network, and search for the terrestrial network. The communication processor 620 may search for the terrestrial network, based on whether the signal of the frequency band supported by the terrestrial network is received when the search for the network is performed. The communication processor 620 may identify the signal of the frequency band supported by the terrestrial network and determine that the search for the terrestrial network is successful based on the quality of the signal being higher than or equal to a predetermined value. The communication processor 620 may determine that the search for the terrestrial network fails based on non-reception of the signal of the frequency band supported by the terrestrial network or the quality of the signal being equal to or lower than a predetermined value although the signal is received.

The communication processor 620 may search for the terrestrial network in the state of the connection to the non-terrestrial network regardless of the location of the electronic device. The communication processor 620 may periodically search for the terrestrial network regardless of a priority of the communication connection in a state in which the terrestrial network does not provide a service (no service). The communication processor 620 may periodically search for the terrestrial network even in a state in which the priority of the non-terrestrial network for the communication connection is relatively higher than the terrestrial network. The communication processor 620 may periodically search for the terrestrial network to establish the communication connection to the terrestrial network having a relatively lower priority in spite of a state of the connection to the non-terrestrial network. A search period may be, for example, one time per hour and vary depending on settings.

When a cell supporting the terrestrial network is found, the communication processor 620 may add the location of the electronic device 101 and frequency information when the cell is found to a list in which location information of the electronic device 101 and frequency information are mapped. The communication processor 620 may determine a frequency of the terrestrial network to be found using the list stored in the memory when the search for the terrestrial network is performed. For example, the location of the electronic device at the time when the cell is found is A, the frequency band is 60 GHZ, the location of the electronic device at the time when the cell is found is B, and the frequency band is 62 GHZ. In this case, the communication processor 620 may determine a frequency band (for example, 60 GHZ or 62 GHZ) to perform the search based on the location of the electronic device 101 (for example, A or B).

The communication processor 620 may store frequency information of at least one terrestrial network cell received from an external server in the memory and determine the frequency of the terrestrial network to be found using the frequency information of the terrestrial network stored in the memory when the search for the terrestrial network is performed. For example, the frequency information of at least one terrestrial network cell received from the external server may include a location of the terrestrial network cell and a frequency band of a signal transmitted by the corresponding cell. When the location of the terrestrial network cell is A and the frequency band of the transmitted signal is 60 GHz, the communication processor 620 may determine the frequency band to perform the search, based on the location of the electronic device 101.

In the state in which the terrestrial network is found, the communication processor 620 may make the connection of the found terrestrial network, based on reference signal received power (RSRP) of the signal transmitted by the found terrestrial network being larger than reference signal received power (RSRP) of the signal transmitted by the non-terrestrial network.

When the terrestrial network is found, the communication processor 620 may identify progress of data transmission through the non-terrestrial network and determine whether to maintain the connection of the non-terrestrial network according to the progress of the data transmission. In the situation in which the terrestrial network is found, the communication processor 620 may make the connection of the found terrestrial network, based on the progress of the data transmission through the non-terrestrial network being lower than a preset level and may maintain the connection of the non-terrestrial network without making the connection of the found terrestrial network, based on the progress of the data transmission of the non-terrestrial network being higher than a preset rate. The progress of the data transmission may be determined using an amount of data which has been completely transmitted and a total amount of data. According to an embodiment, the progress of the data transmission may refer to a ratio between the size of data to be transmitted when transmission starts and the size of data which has been completely transmitted. For example, the communication processor 620 may maintain the connection with the non-terrestrial network without making the connection of the found terrestrial network, based on the progress of the data transmission being higher than 70%. 70% is only an example and may vary depending on settings.

In the situation in which the terrestrial network is found, the communication processor 620 may determine (or estimate) time left until data transmission is completed in the non-terrestrial network, make the connection of the found terrestrial network, based on the time left until the data transmission is completed being longer than preset time, and maintain the connection with the non-terrestrial network without making the connection of the found terrestrial network, based on the time left until the data transmission is completed being shorter than the preset time. For example, the communication processor 620 may maintain the connection with the non-terrestrial network without making the connection of the found terrestrial network, based on the time left until data transmission is completed being shorter than 10 seconds. 10 seconds is only an example and is not a fixed value, and may vary depending on settings.

When the search for the terrestrial network is successful, the communication processor 620 may make the connection with the found terrestrial network.

Figure 7:
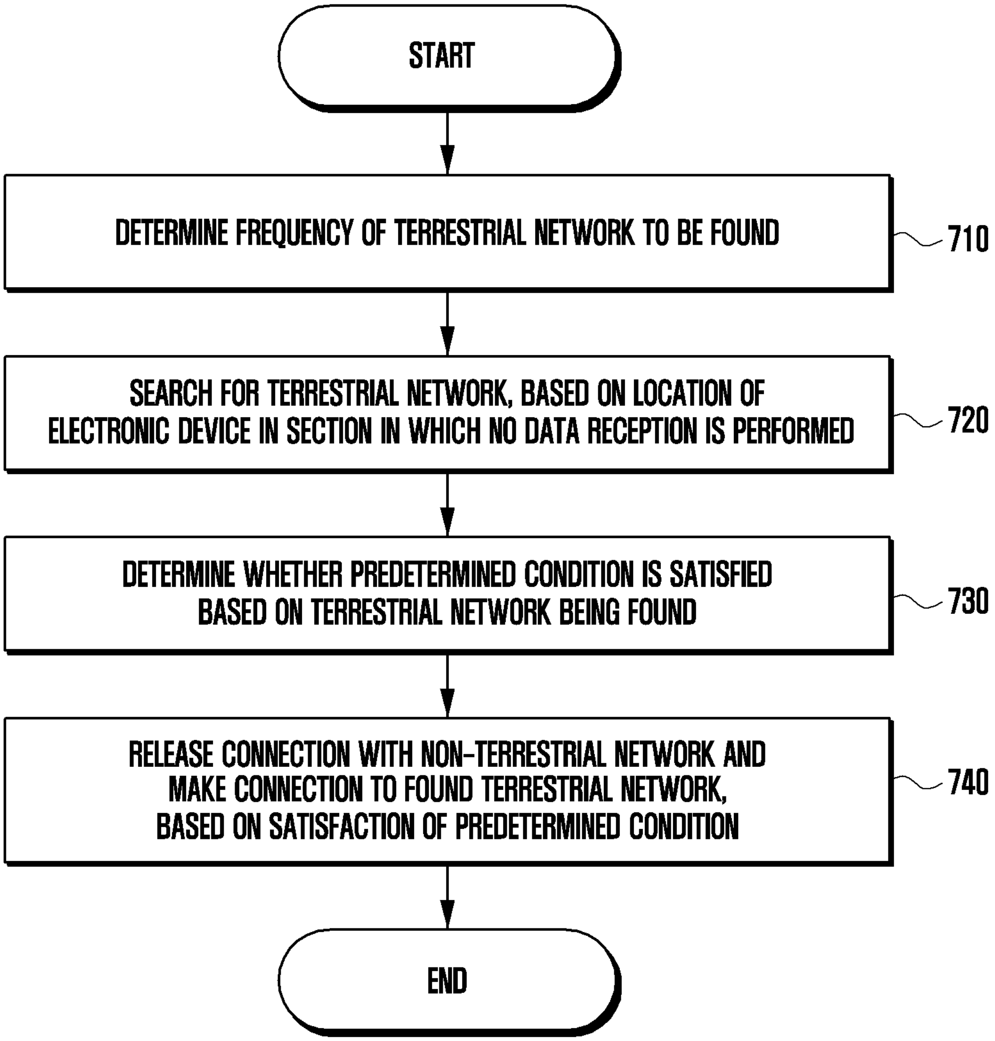
FIG. 7 is a flowchart illustrating an example terrestrial network search operation of an electronic device according to various embodiments.

FIG. 7 is a flowchart illustrating an example terrestrial network search operation of an electronic device according to various embodiments.

Operations described with reference to FIG. 7 may be implemented based on instructions which can be stored in a computer-readable medium or a memory (for example, the memory 130 of FIG. 1). The illustrated method may be performed by the electronic device (for example, the electronic device 101 of FIG. 1) described with reference to FIGS. 1, 2, 3, 4, 5 and 6 (which may be referred to herein as FIGS. 1 to 6), and the technical characteristics described above may not be repeated hereinafter. The order of respective operations in FIG. 7 may be changed, some operations may be omitted, and some operations may be simultaneously performed.

In operation 710, a communication processor (for example, the communication processor 620 of FIG. 6) may determine a frequency of a terrestrial network to be found.

According to an embodiment, the communication processor 620 may store frequency information of a cell found by a search for a terrestrial network cell in the memory 130 in the form of a list. When searching for the terrestrial network, the communication processor 620 may determine a terrestrial network to be found using the list stored in the memory 130.

The communication processor 620 may store frequency information of at least one terrestrial network cell received from an external server in the memory 130. When searching for the terrestrial network, the communication processor 620 may determine a frequency band of the terrestrial network to be found using the frequency information of the terrestrial network cell stored in the memory 130.

In operation 720, the communication processor 620 may search for the terrestrial network, based on the location of the electronic device 101 in a section in which no data reception is performed. The section in which no data reception is performed may refer, for example, to a guard period (GP) in a time division duplex (TDD) system and may include a section in which no communication is performed in a frequency division duplex (FDD) system. The section in which no data is received may refer, for example, to a section in which only an uplink is transmitted in time division duplex (TDD) and frequency division duplex (FDD). An embodiment in which the search for the terrestrial network is performed based on the location of the electronic device 101 is described in greater detail below with reference to FIGS. 8A and 8B.

In operation 730, the communication processor 620 may determine whether a predetermined (e.g., specified) condition is satisfied based on the terrestrial network being found. The predetermined condition may include one of, for example, reference signal received power (RSRP), progress of data transmission, or time left until data transmission is completed. An embodiment of the predetermined condition is described with reference to FIGS. 9A and 9B.

In operation 740, the communication processor 620 may release the connection with the non-terrestrial network and make the connection to the found terrestrial network, based on satisfaction of the predetermined condition. According to an embodiment, the communication processor 620 may establish the connection with the terrestrial network, based on the terrestrial network being found regardless of whether the predetermined condition is satisfied.

Figure 8A:
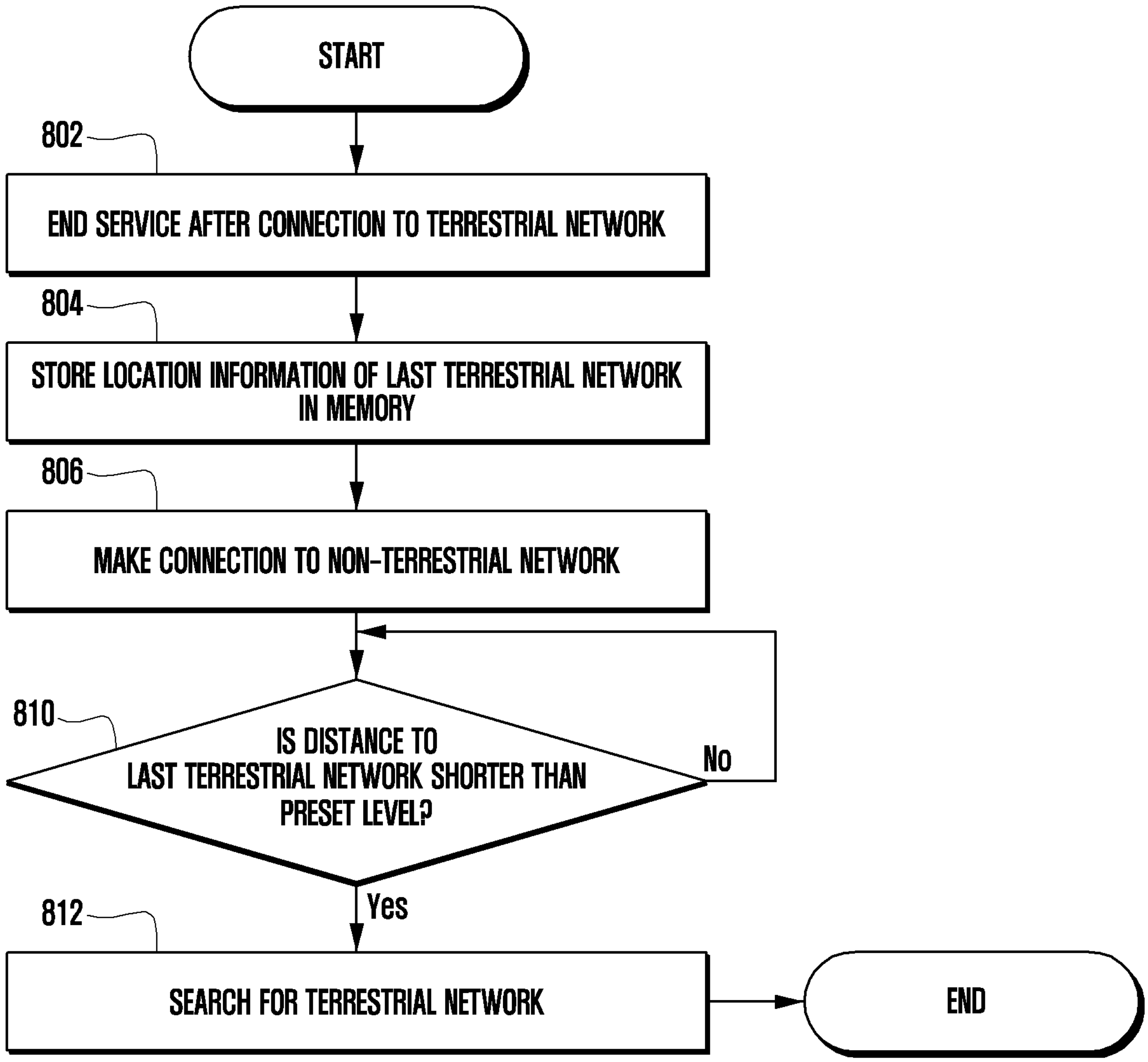
FIG. 8A is a flowchart illustrating an example operation of determining whether to search for a terrestrial network, based on a location of an electronic device according to various embodiments.

FIG. 8A is a flowchart illustrating an example operation of determining whether to search for a terrestrial network, based on a location of an electronic device according to various embodiments.

In operation 802, a communication processor (for example, the communication processor 620 of FIG. 6) may identify that a service for the connection of the terrestrial network ends. The communication processor 620 may identify that the search for the terrestrial network fails and thus the communication connection is not established.

In operation 804, the communication processor 620 may store location information of the last connected terrestrial network in a memory (for example, the memory 130 of FIG. 1) or a database (DB).

In operation 806, the communication processor 620 may establish the communication connection with the non-terrestrial network.

In operation 810, the communication processor 620 may determine whether a distance to the last terrestrial network from the location of the current electronic device (for example, the electronic device 101 of FIG. 1) is shorter than a preset (e.g., specified) level. For example, the communication processor 620 may determine whether a distance to a location at which a signal of the last terrestrial network is detected from the location of the current electronic device 101 is shorter than a preset level (for example, 10 m). The preset level (for example, 10 m) is only an example and may vary depending on settings. The communication processor 620 may determine whether a distance to a location at which the signal of the terrestrial networks is disconnected from the location of the current electronic device 101 is shorter than a preset level (for example, 10 m).

The communication processor 620 may periodically perform operation 810, based on the distance to the location at which the signal of the last terrestrial network is detected from the location of the current electronic device 101 being longer than the preset level. The communication processor 620 may periodically detect movement of the location of the electronic device 101. A period (for example, one time per 10 minutes) of operation 810 is not a fixed value and may vary depending on settings.

In operation 812, the communication processor 620 may search for the terrestrial network, based on the distance to the last terrestrial network from the location of the current electronic device 101 is shorter than the preset level (operation 810—Yes).

Figure 8B:
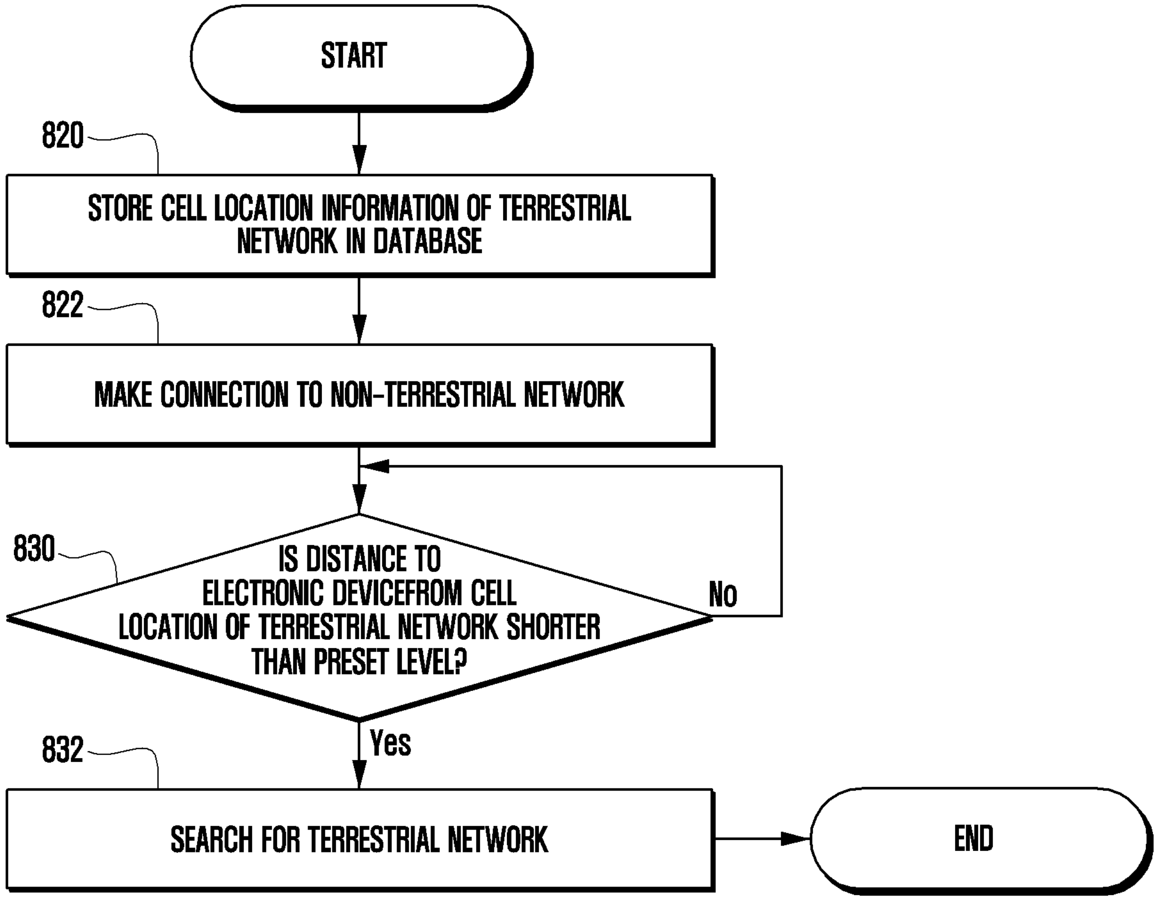
FIG. 8B is a flowchart illustrating an example operation of determining whether to search for a terrestrial network, based on a location of an electronic device according to various embodiments.

FIG. 8B is a flowchart illustrating an example operation of determining whether to search for a terrestrial network, based on the location of the electronic device 101 according to various embodiments.

In operation 820, the communication processor 620 may store location information of a cell of the terrestrial network in the memory 130 or the database (DB). The communication processor 620 may store the location of the cell of the terrestrial network having a history of previous connections, and receive information on a location of a base station from an external service and store the same.

In operation 822, the communication processor 620 may make the connection to the non-terrestrial network.

In operation 830, the communication processor 620 may determine whether the distance to the electronic device 101 from the location at which the signal of the last terrestrial network is detected is shorter than the preset level (for example, 10 m). The preset level (for example, 10 m) is only an example and may vary depending on settings. The communication processor 620 may determine whether a distance to a location at which the signal of the terrestrial networks is disconnected from the location of the current electronic device 101 is shorter than a preset level (for example, 10 m).

The communication processor 620 may periodically perform operation 830, based on the distance to the electronic device 101 from the location at which the signal of the last terrestrial network is detected being longer than the preset level (for example, 10 m). The communication processor 620 may periodically detect movement of the location of the electronic device 101. A period (for example, one time per 10 minutes) of operation 830 is not a fixed value and may vary depending on settings.

In operation 832, the communication processor 620 may search for the terrestrial network, based on the distance to the electronic device 101 from the location of the cell of the terrestrial network being shorter than the preset level (for example, 10 m) (for example, operation 830—Yes).

According to an embodiment, the communication processor 620 may configure a condition so that the terrestrial network is always searched for in the state in which the communication connection with the non-terrestrial network is made regardless of the current location of the electronic device 101. In this case, the communication processor 620 may search for the terrestrial network in a section in which no data is received from the connected non-terrestrial network.

Figure 9A:
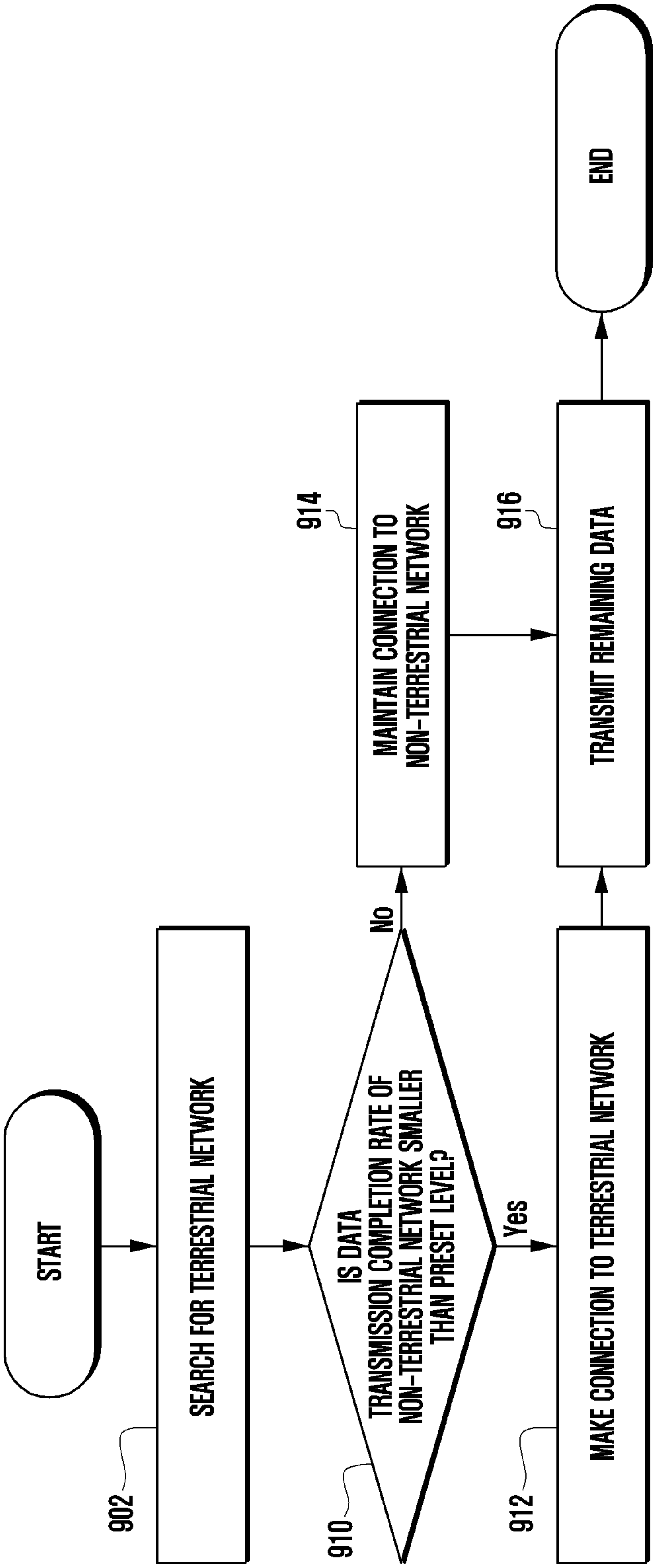
FIG. 9A is a flowchart illustrating an example operation of determining whether to make a connection to a terrestrial network, based on a data transmission completion rate of a non-terrestrial network according to various embodiments.

FIG. 9A is a flowchart illustrating an example operation of determining whether to make the connection to the terrestrial network, based on a data transmission completion rate of the non-terrestrial network according to various embodiments.

In operation 902, a communication processor (for example, the communication processor 620 of FIG. 6) may search for a terrestrial network.

In operation 910, the communication processor 620 may determine whether a data transmission completion rate of the non-terrestrial network is less than a preset level (for example, 30%). The preset level (for example, 30%) is only an example and may vary depending on settings. The data transmission completion rate may be determined as a ratio of an amount of data which is currently completely transmitted to a total amount of data.

In operation 912, the communication processor 620 may release the connection with the connected non-terrestrial network and make the connection to the terrestrial network, based on the data transmission completion rate of the non-terrestrial network being smaller than the preset level (for example, 30%) (operation 910—Yes). For example, the communication processor 620 may release the connection with the non-terrestrial network, based on the data transmission completion rate of the non-terrestrial network regardless of a handover procedure according to the standard of the 3GPP. When the data transmission completion rate of the non-terrestrial network is less than the preset level (for example, 30%), a transmission rate of data transmitted through the connection to the terrestrial network may be relatively faster than that of the remaining data transmitted through the non-terrestrial network. In this case, the communication processor 620 may transmit data through the connection to the terrestrial network.

When the data transmission completion rate of the non-terrestrial network is greater than the preset level (for example, 30%) (operation 910—No), the communication processor 620 may maintain the connection with the non-terrestrial network in operation 914. When the data transmission completion rate of the non-terrestrial network is greater than the preset level (for example, 30%), a transmission rate of the remaining data transmitted through the non-terrestrial network may be relatively faster than that of data transmitted through the connection to the terrestrial network. In this case, the communication processor 620 may maintain the connection with the non-terrestrial network and transmit data.

In operation 916, the communication processor 620 may transmit the remaining data through the non-terrestrial network or the terrestrial network.

Figure 9B:
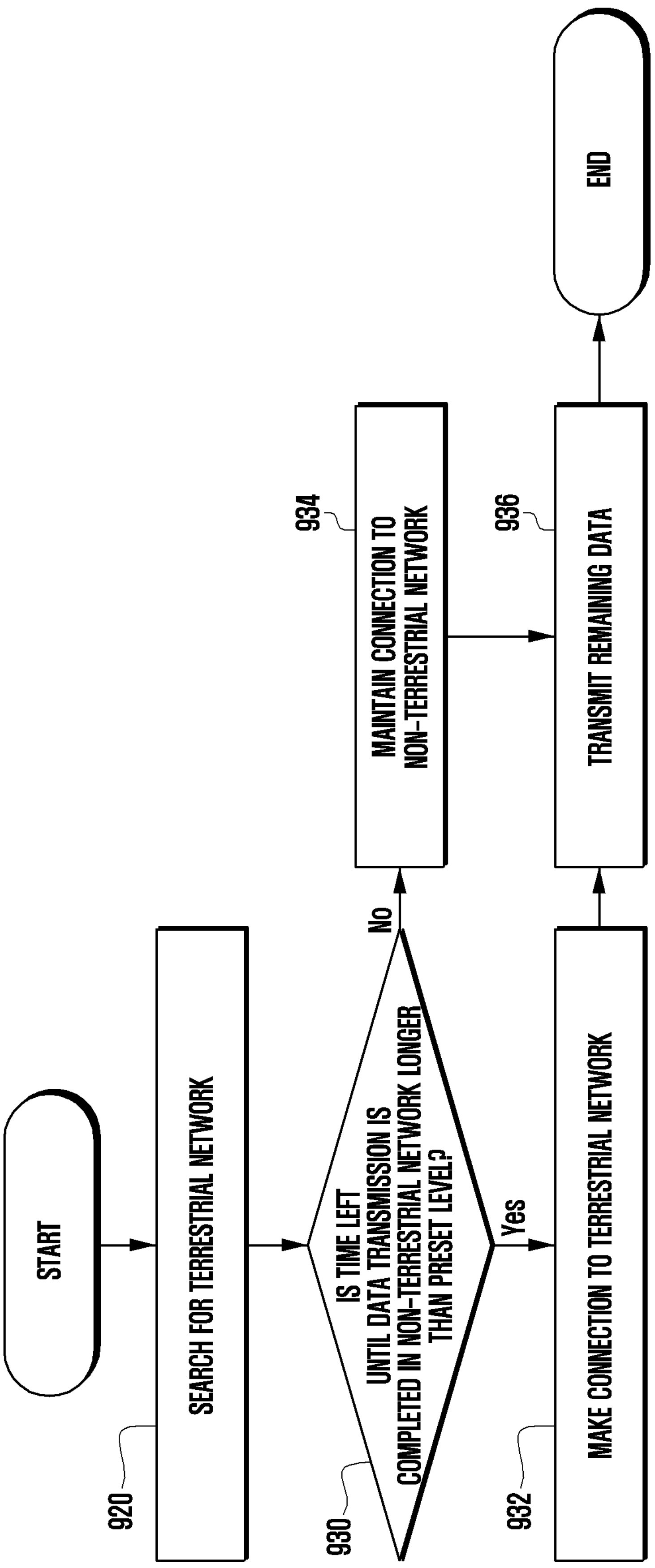
FIG. 9B is a flowchart illustrating an example operation of determining whether to make a connection to a terrestrial network, based on time left until data transmission is completed in a non-terrestrial network according to various embodiments.

FIG. 9B is a flowchart illustrating an example operation of determining whether to make the connection to the terrestrial network, based on time left until data transmission is completed in the non-terrestrial network according to various embodiments.

In operation 920, the communication processor 620 may search for a terrestrial network.

In operation 930, the communication processor 620 may determine whether the time left until data transmission is completed in the non-terrestrial network is greater than preset time (for example, 10 seconds). The preset time (for example, 10 seconds) is only an example and may vary depending on settings.

In operation 932, the communication processor 620 may make the connection to the terrestrial network, based on the time left until data transmission is completed being greater than the preset time (for example, 10 seconds) (operation 930—Yes). When the time left until data transmission is completed is greater than the preset time (for example, 10 seconds), a transmission rate of data transmitted through the connection to the terrestrial network may be relatively faster. In this case, the communication processor 620 may transmit data through the connection to the terrestrial network.

In operation 934, the communication processor 620 may maintain the connection with the non-terrestrial network, based on the time left until data transmission is completed being less than the preset time (for example, 10 seconds) (operation 930—No). When the time left until data transmission is completed is less than the preset time (for example, 10 seconds), a transmission rate of the remaining data transmitted through the non-terrestrial network may be relatively faster than that of data transmitted through the connection to the terrestrial network. In this case, the communication processor 620 may maintain the connection with the non-terrestrial network and transmit data.

The communication processor 620 may make the connection to the terrestrial network or maintain the connection with the non-terrestrial network, based on a ratio of transmission time of the remaining data to current transmission time of data. For example, when the current transmission time of data is 100 seconds and the transmission time of the remaining data is 15 seconds, the communication processor 620 may determine that the ratio of the transmission time of the remaining data is 15%. The communication processor 620 may determine to maintain the connection with the non-terrestrial network, based on the ratio of the transmission time of the remaining data being smaller than a preset level (for example, 20%). The predetermined level (for example, 20%) is only an example and may vary depending on settings.

In operation 936, the communication processor 620 may transmit the remaining data through the non-terrestrial network or the terrestrial network.

Figure 10:
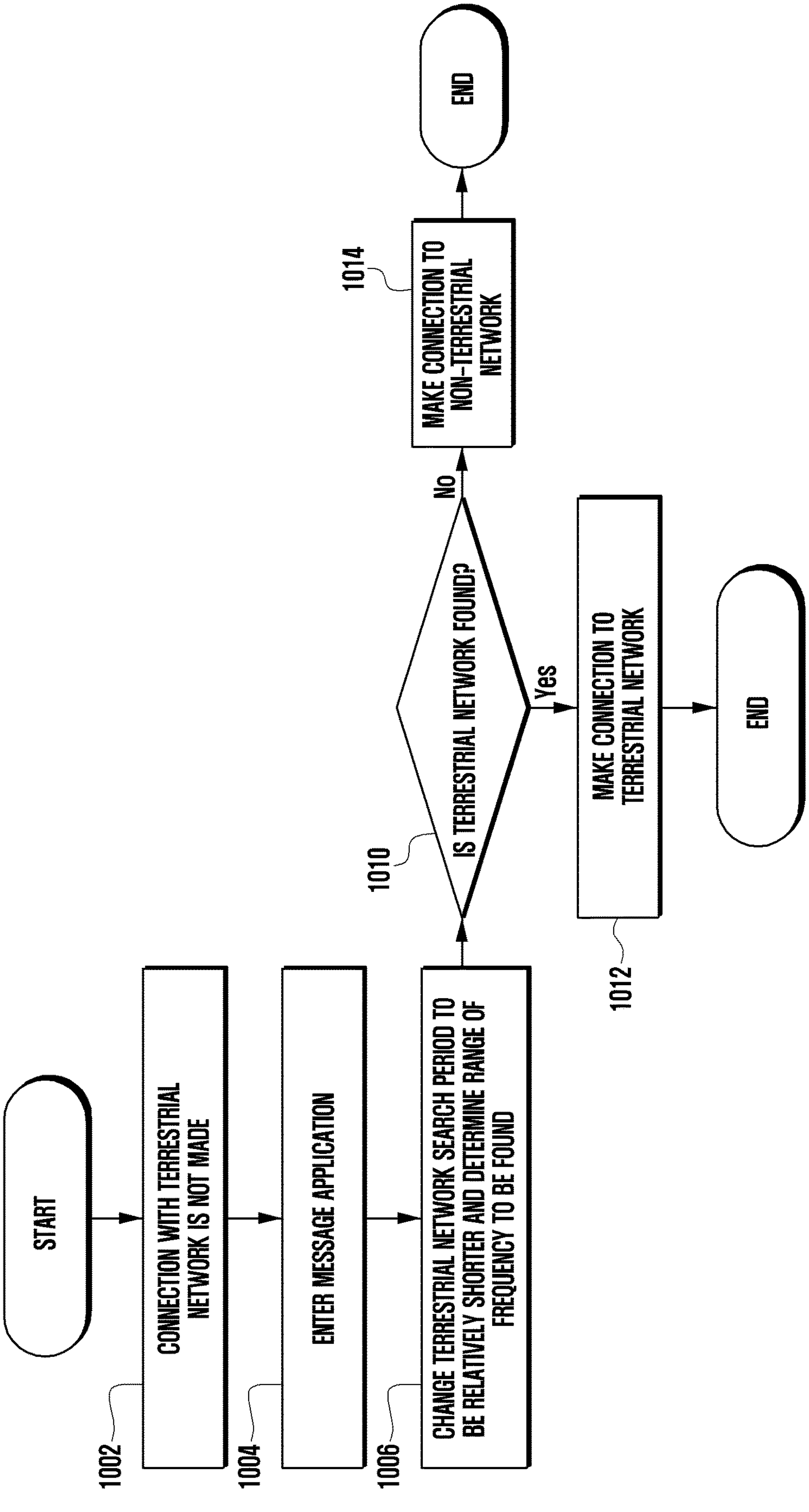
FIG. 10 is a flowchart illustrating an example terrestrial network search process of an electronic device according to various embodiments.

FIG. 10 is a flowchart illustrating an example terrestrial network search process of an electronic device according to various embodiments.

In operation 1002, a communication processor (for example, the communication processor 620 of FIG. 6) may determine that the connection with the terrestrial network is not made. In this case, the communication processor 620 may determine whether there is no connected network, no terrestrial network is found and thus the connection with the non-terrestrial network is made, or the terrestrial network is found but a priority thereof is relatively lower than the non-terrestrial network and thus the connection with the non-terrestrial network is not made.

In operation 1004, an application processor (for example, the processor 120 of FIG. 1) may enter a specific application (for example, a message application) to make the connection with the terrestrial network or the non-terrestrial network. After executing the specific application (for example, the message application), the application processor 120 may transmit information related to execution of the specific application (for example, the message application) to the communication processor 620.

In operation 1006, the communication processor 620 may change a terrestrial network search period to be relatively shorter than the existing search period, based on reception of information indicating that the specific application (for example, the message application) is executed from the application processor (for example, the processor 120 of FIG. 1). The terrestrial network search period (for example, 5 seconds) may vary depending on settings. The communication processor 620 may determine a range of a frequency to be found based on entry into the specific application (for example, the message application). The communication processor 620 may store frequency information of a cell found by a terrestrial network cell search in the memory 130 in the form of a list. Alternatively, the communication processor 620 may store frequency information of at least one terrestrial network cell received from an external server in the memory 130. The communication processor 620 may search for a terrestrial network in a relevant frequency range, based on the stored frequency information. The communication processor 620 may search for a terrestrial network for another frequency range supported by the electronic device 101 at a specific time point regardless of the stored frequency information while searching for the terrestrial network in the relevant frequency range based on the stored frequency information.

In operation 1010, the communication processor 620 may identify whether the terrestrial network is found.

In operation 1012, the communication processor 620 may make the connection with the terrestrial network, based on the terrestrial network being found (operation 1010—Yes).

In operation 1014, the communication processor 620 may make the connection with the non-terrestrial network, based on no terrestrial network being found. The communication processor 620 may maintain the connection with the non-terrestrial network, based on no terrestrial network being found.

An electronic device according to an example embodiment may include: a communication circuit configured to support cellular communication through a terrestrial network and a non-terrestrial network and at least one communication processor, comprising communication circuitry, wherein at least one communication processor, individually and/or collectively, may be configured to determine, based on a frequency of a terrestrial network having a previous connection history before a connection to the non-terrestrial network and/or frequency information of a pre-stored terrestrial network, a frequency of the terrestrial network to be found, perform a search for the terrestrial network in a section in which data is not received, based on a location of the electronic device, and determine whether to release a connection with the non-terrestrial network and make the connection to the terrestrial network, based on whether a specified condition is satisfied as the terrestrial network is found.

At least one communication processor, individually and/or collectively, may be configured to identify that the electronic device is within a specified distance from a location at which a signal of the terrestrial network is detected before the connection to the non-terrestrial network and perform a search for the terrestrial network.

At least one communication processor, individually and/or collectively, may be configured to identify location information of a terrestrial network cell, based on pre-stored terrestrial network cell location information and perform a search for the terrestrial network, based on the location of the electronic device within a specified distance from the terrestrial network cell.

At least one communication processor, individually and/or collectively, may be configured to perform a search for the terrestrial network during the connection to the non-terrestrial network regardless of the location of the electronic device.

At least one communication processor, individually and/or collectively, may be configured to, based on a terrestrial network cell being found, store frequency information of the found cell in a memory in the form of a list and, based on the search for the terrestrial network being performed, determine a frequency of the terrestrial network to be found using the list stored in the memory.

At least one communication processor, individually and/or collectively, may be configured to store frequency information of at least one terrestrial network cell received from an external server in a memory and, based on the search for the terrestrial network being performed, determine a frequency of the terrestrial network to be found using frequency information of the terrestrial network cell stored in the memory.

At least one communication processor, individually and/or collectively, may be configured to, based on a terrestrial network being found, make a connection to the found terrestrial network, based on reference signal received power (RSRP) of a signal transmitted by the found terrestrial network being greater than reference signal received power (RSRP) of a signal transmitted by the non-terrestrial network.

A method of operating an electronic device according to an example embodiment may include: determining, based on a frequency of a terrestrial network having a previous connection history before a connection to the non-terrestrial network and/or frequency information of a pre-stored terrestrial network, a frequency of the terrestrial network to be found, performing a search for the terrestrial network in a section in which data is not received, based on a location of the electronic device, and determining whether to release a connection with the non-terrestrial network and make the connection to the found terrestrial network according to whether a specified condition is satisfied based on the terrestrial network being found.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a communication circuit configured to support cellular communication through a terrestrial network and a non-terrestrial network; and at least one communication processor, comprising processing circuitry, wherein at communication processor, individually and/or collectively, is configured to:

determine, based on a frequency of a terrestrial network having a previous connection history before a connection to the non-terrestrial network and/or frequency information of a pre-stored terrestrial network, a frequency of the terrestrial network to be found;

perform a search for the terrestrial network in a section in which data is not received, based on a location of the electronic device, wherein the section in which data is not received comprises a guard period (GP) in a time division duplex (TDD) system and a section in which communication is not performed in a frequency division duplex (FDD) system; and determine whether to release a connection with the non-terrestrial network and make the connection to the found terrestrial network according to whether a specified condition is satisfied based on the terrestrial network being found.

2. The electronic device of claim 1, wherein at least one communication processor, individually and/or collectively, is configured to:

identify that the electronic device is within a specified distance from a location at which a signal of the terrestrial network is detected before the connection to the non-terrestrial network; and perform a search for the terrestrial network.

3. The electronic device of claim 1, wherein at least one communication processor, individually and/or collectively, is configured to identify location information of a terrestrial network cell, based on pre-stored terrestrial network cell location information and perform a search for the terrestrial network, based on the location of the electronic device within a specified distance from the terrestrial network cell.

4. The electronic device of claim 1, wherein at least one communication processor, individually and/or collectively, is configured to perform a search for the terrestrial network during the connection to the non-terrestrial network regardless of the location of the electronic device.

5. The electronic device of claim 1, wherein at least one communication, individually and/or collectively, is configured to:

based on a terrestrial network cell being found, store frequency information of the found cell in a memory in the form of a list; and based on the search for the terrestrial network being performed, determine a frequency of the terrestrial network to be found using the list stored in the memory.

6. The electronic device of claim 1, wherein at least one communication processor, individually and/or collectively, is configured to:

store frequency information of at least one terrestrial network cell received from an external server in a memory; and based on the search for the terrestrial network being performed, determine a frequency of the terrestrial network to be found using frequency information of the terrestrial network cell stored in the memory.

7. The electronic device of claim 1, wherein at least one communication processor, individually and/or collectively, is configured to, based on a terrestrial network being found, make a connection to the found terrestrial network, based on reference signal received power (RSRP) of a signal transmitted by the found terrestrial network being greater than reference signal received power (RSRP) of a signal transmitted by the non-terrestrial network.

8. The electronic device of claim 1, wherein at least one communication processor, individually and/or collectively, is configured to, based on a terrestrial network being found:

make a connection to the found terrestrial network, based on progress of data transmission of the non-terrestrial network being less than a specified level; and maintain the connection with the non-terrestrial network without making the connection to the found terrestrial network, based on the progress of data transmission of the non-terrestrial network being greater than a specified rate, and wherein the progress of the data transmission is determined using an amount of data which has been currently completely transmitted and a total amount of data.

9. The electronic device of claim 1, wherein at least one communication processor, individually and/or collectively, is configured to, based on a terrestrial network being found:

determine a time left until data transmission is completed in the non-terrestrial network;

make the connection to the found terrestrial network, based on the time left until data transmission is completed being greater than a specified time; and maintain the connection with the non-terrestrial network without making the connection to the found terrestrial network, based on the time left until the data transmission is completed being less than a specified time.

10. A method of operating an electronic device, the method comprising:

determining, based on a frequency of a terrestrial network having a previous connection history before a connection to the non-terrestrial network and/or frequency information of a pre-stored terrestrial network, a frequency of the terrestrial network to be found;

performing a search for the terrestrial network in a section in which data is not received, based on a location of the electronic device, wherein the section in which data is not received comprises a guard period (GP) in a time division duplex (TDD) system and a section in which communication is not performed in a frequency division duplex (FDD) system; and determining whether to release a connection with the non-terrestrial network and make the connection to the terrestrial network, based on whether a specified condition is satisfied as the terrestrial network is found.

11. The method of claim 10, the performing of the search for the terrestrial network, based on the location of the electronic device, further comprises:

determining a location at which a signal of the terrestrial network is last detected before a connection to the non-terrestrial network; and performing the search for the terrestrial network, based on the location of the electronic device within a specified distance from the corresponding location, based on the location at which the signal of the terrestrial network is last detected.

12. The method of claim 10, wherein the performing of the search for the terrestrial network, based on the location of the electronic device, further comprises identifying location information of a terrestrial network cell, based on pre-stored terrestrial network cell location information and performing a search for the terrestrial network, based on the location of the electronic device within a specified distance from the terrestrial network cell.

13. The method of claim 10, wherein the performing of the search for the terrestrial network, based on the location of the electronic device, further comprises performing the search for the terrestrial network regardless of the location of the electronic device during the connection to the non-terrestrial network.

14. The method of claim 10, wherein the determining of the frequency of the terrestrial network to be found further comprises:

based on a terrestrial network cell being found, storing frequency information of the found cell in a memory in the form of a list; and based on the search for the terrestrial network being performed, determining a frequency of the terrestrial network to be found using the list stored in the memory.

15. The method of claim 10, wherein the determining of the frequency of the terrestrial network to be found further comprises storing frequency information of at least one terrestrial network cell received from an external server in a memory and, based on the search for the terrestrial network being performed, determining a frequency of the terrestrial network to be found using frequency information of the terrestrial network cell stored in the memory.

16. The method of claim 10, wherein the determining whether to release the connection with the non-terrestrial network and make the connection to the terrestrial network, based on whether the specified condition is satisfied, further comprises making the connection to the found terrestrial network, based on reference signal received power (RSRP) of a signal transmitted by the found terrestrial network being greater than reference signal received power (RSRP) of a signal transmitted by the non-terrestrial network.

17. The method of claim 10, wherein the determining whether to release the connection with the non-terrestrial network and make the connection to the terrestrial network, based on whether the specified condition is satisfied, further comprises, based on the terrestrial network being found:

making a connection to the found terrestrial network, based on progress of data transmission of the non-terrestrial network being less than a specified level; and maintaining the connection with the non-terrestrial network without making the connection to the found terrestrial network, based on the progress of data transmission of the non-terrestrial network being greater than a specified rate, and wherein the progress of the data transmission is determined using an amount of data which has been currently completely transmitted and a total amount of data.

18. The method of claim 10, wherein the determining whether to release the connection with the non-terrestrial network and make the connection to the terrestrial network, based on whether the specified condition is satisfied, further comprises, based on the terrestrial network being found:

determining a time left until data transmission is completed in the non-terrestrial network;

making the connection to the found terrestrial network, based on the time left until data transmission is completed being greater than a specified time; and maintaining the connection with the non-terrestrial network without making the connection to the found terrestrial network, based on the time left until the data transmission is completed being less than a specified time.

* * * * *